May 11, 1965  G. B. RABE  3,182,448
ROCKET MOTOR CONSTRUCTION
Filed June 22, 1960  2 Sheets-Sheet 1

INVENTOR.
GEORGE B. RABE
BY
HIS AGENT

May 11, 1965 G. B. RABE 3,182,448
ROCKET MOTOR CONSTRUCTION
Filed June 22, 1960 2 Sheets-Sheet 2

INVENTOR.
GEORGE B. RABE
BY
AGENT

United States Patent Office 3,182,448
Patented May 11, 1965

3,182,448
ROCKET MOTOR CONSTRUCTION
George B. Rabe, Sparta, N.J., assignor to Thiokol Chemical Corporation, Bristol, Pa., a corporation of Delaware
Filed June 22, 1960, Ser. No. 37,882
4 Claims. (Cl. 60—35.6)

This invention relates in general to liquid-cooled axial flow thrust chambers for rocket motors and has particular reference to thrust chambers of the tube-bundle type wherein plural axial tubes or tube-forming members are united to form a coolant-jacket wall of the thrust chamber in each instance.

It is the primary object of the present invention to provide an improved tube-bundle structure composed of united elements or pairs of mated longitudinal tube-forming channel members capable of being assembled in differently spaced arrangements to produce coolant passages of varying predetermined cross-sectional area.

Another object of the invention is to provide a tube-bundle thrust chamber of the construction just mentioned wherein the mated channel members of each element or pair are capable of rapid quantity production at minimum cost by the use of co-related male and female dies in a power-press or brake.

A further object is to provide a double channel tube bundle whose component pairs of mated channel members are of such form that the channel members of each individual pair may be easily secured together in a manner to contain the high coolant pressure, and the entire assembly of mated pairs of channel members may also be easily secured together, by simple welding and/or brazing processes in both instances, in a manner that will contain the high coolant pressure and the high pressure within the combustion chamber encountered in thrust chamber operation. Wire wrap and bands are often used to aid in containing the combustion gas pressure when this pressure is of large magnitude.

Some other advantages of my double-channel tube-bundle thrust chamber are enumerated below:

(1) The channels can be fitted together to provide any coolant velocity at any point in the chamber as determined by heat transfer considerations.

(2) Fewer elements are needed when compared with an equivalent spaghetti tube chamber.

(3) It has a very low wet weight and dry weight.

(4) It can be readily manufactured using existing techniques.

(5) Leaky chambers can be sealed from the outside very easily.

Still further objects, advantages and features will become apparent as the following specific description is read in connection with the accompanying drawing in which.

Figure 1:
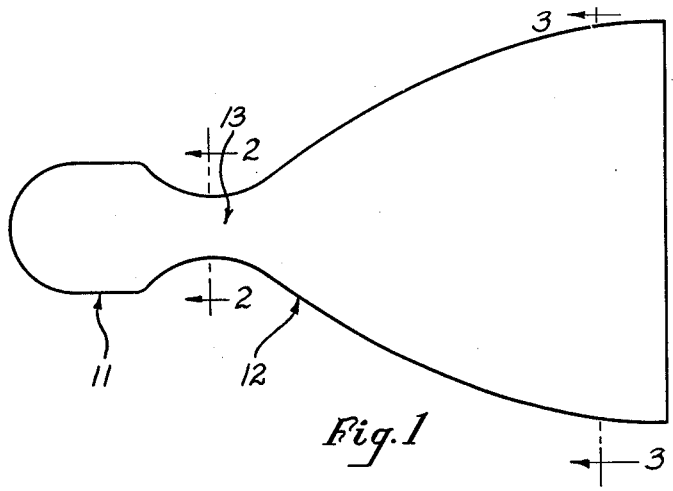
FIGURE 1 is a longitudinal sectional view of a thrust chamber constructed in accordance with the invention.

Referring now in detail to the drawing, wherein like reference characters designate corresponding parts in the several views, it will be observed that the coolant jacketed wall of my improved tube-bundle thrust chamber is composed of plural longitudinally extending double-channel elements 10 that are elongated, curved structures arranged in substantial circumferential parallelism and abutment. The general longitudinal configuration of each element 10 conforms to the characteristic wall contour of a conventional thrust chamber to include the upstream substantially cylindrical combustion chamber section 11 and the downstream convergent-divergent nozzle section 12 having a constricted throat 13.

Each double-channel element 10 comprises an inner female channel member 14 and a longitudinally coextensive outer male channel member 15. Inner female channel member 14 is substantially U-shaped in cross-section at any point throughout its length and includes radially parallel side walls 16—16 and an interconnecting bottom cross wall 17 which preferably is concavo-convex and arranged with its convex face inwardly facing toward the chamber axis. Outer male channel member 15 is similarly U-shaped in cross-section and includes parallel side walls 16'—16' and similarly arranged concavo-convex bottom cross wall 17'. The space between the side walls 16—16 of inner female channel member 14 is sufficiently greater than the spacing of side walls 16'—16' of outer male channel member 15 to permit said male channel member to be inset in said female member with a snugly even fit to a predetermined depth depending upon the radial spacing required between the respective bottom cross walls 17 and 17' of channel members 14 and 15 to afford the coolant passage geometry necessary for the desired coolant volume, velocity and pressure as related to the cross-sectional area of the passage 18 defined between said cross walls.

Figure 2:
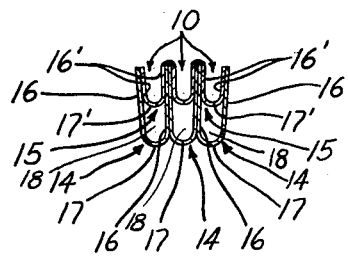
FIGURE 2 is a partial transverse section on line 2—2 of FIGURE 1.
Figure 3:
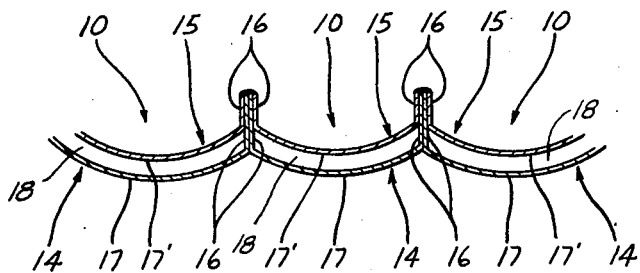
FIGURE 3 is a similar view on line 3—3 of FIGURE 1.
Figures 4, 5:
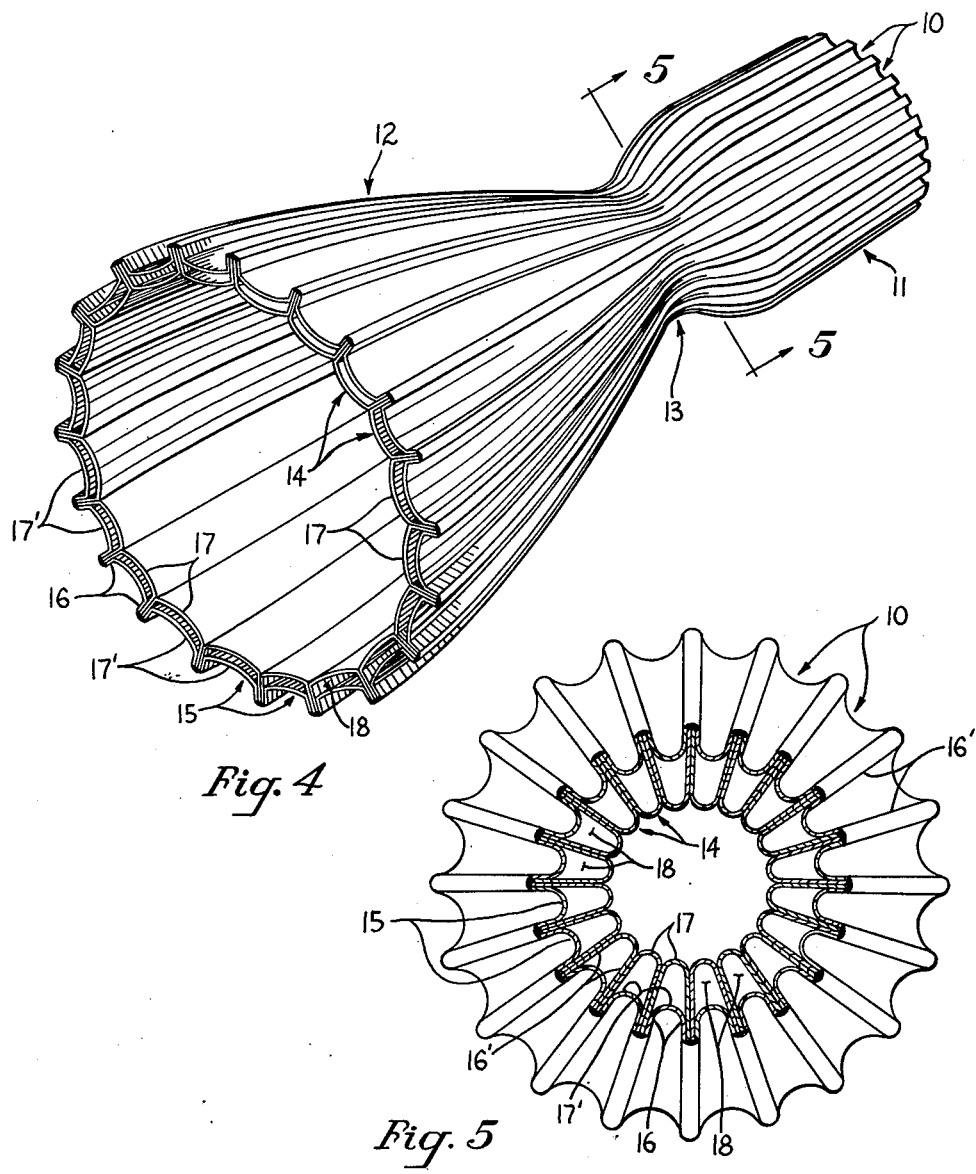
FIGURE 4 is a perspective view of the motor shown in FIGURE 1.
FIGURE 5 is a cross-section on line 5—5 of FIGURE 4.

The radial extent of side walls 16—16 of inner female channel member 14 should be sufficient to provide considerable overlap with the contiguous and embraced side walls 16'—16' of mated outer male channel member 15. This overlap serves to give rigidity to the joint and to provide adequate areas of abutting surfaces for seam welding, brazing, or other means for securing said mated channel members together. As shown in FIGURES 2 and 3, the outwardly presented free edges of the side walls 16—16 and 16'—16' respectively of channel members 14 and 15 preferably are substantially flush to form efficient longitudinal heat dissipating fins.

It will be noted by comparison of FIGURES 2 and 3 that the radial depth and circumferential width of each double-channel element 10 varies in direct proportion to changes in diameter of the thrust chamber necessitated by the longitudinal wall contour. This means that joint strength at the areas of side wall abutment near the exit of the divergent portion of nozzle section 12 (FIGURE 3) is critical and probably will require seam welding or overlapping spot welds to provide the necessary strength. At some point between the exit and throat 13 brazing would provide sufficient strength and could be used in the rest of the chamber.

It should now be apparent that I have devised a very versatile thrust chamber construction due to the fact that coolant passage geometry may be modified readily simply by varying the depth at which the component outer male channel members 15 of the respective elements 10 are inset in the corresponding mated inner female channel members 14 prior to application of welding, brazing and/or other securing means.

Because the present invention relates primarily to the double channel tube bundle structure per se, the manifolds and valving means that will be required to regulate flow of coolant fluid through the axial passages 18 have been omitted from the drawings. Obviously, the type and disposition of any such manifolds and valving means will depend upon whether a special coolant fluid is employed or whether regenerative cooling is contemplated, and also upon the intended mode of distribution and direction of flow in the several coolant passages of the thrust chamber jacket as a whole.

While there have been shown and described and pointed out the fundamental novel features of this invention as applied to a single structural embodiment, it will be understood that various omissions and substitutions and changes in the form and details of the device illustrated may be made by those skilled in the art without departing from the spirit of the invention. It is the intention, therefore, to be limited only as indicated by the scope of the following claims.

I claim:
1. A tube-bundle liquid-cooled axial flow thrust chamber for a rocket motor comprising, plural longitudinally coextensive inner female channel members arranged in the circumference of a circle and secured together to form a hollow elongated chamber wall, the longitudinal contour of each said inner channel member being constructed and arranged to give said chamber wall conventional longitudinal contour to include an upstream combustion chamber section of suitable geometrical form and a convergent-divergent downstream nozzle section, each of said inner channel members being substantially U-shaped in cross-section to include substantially parallel side walls and a connecting cross wall and being arranged with said cross wall inwardly presented and the free edges of said side walls outwardly presented, the adjoining side walls of adjacent inner channel members being evenly abutting, and plural separate outer male channel members of substantially U-shaped cross-section corresponding in number to said inner female channel members and being constructed and arranged in partially inset relation to the latter to predetermined depths with their cross walls inwardly presented and the free edges of their side walls outwardly presented like the inner female channel members to provide an axial coolant passage of predetermined cross-sectional area between the cross walls of the inner and outer channel members of each mated pair.

2. A tube-bundle liquid-cooled thrust chamber for a rocket motor as defined in claim 1, wherein the cross walls of the respective inner and outer channel members are concavo-convex in cross section and arranged with the convex faces thereof inwardly presented, whereby the convex faces of the inner walls of the outer male channel members form entering wedges during assembly with the inner female channel members.

3. A tube-bundle liquid-cooled thrust chamber for a rocket motor as defined in claim 1, wherein the side walls of the outer male channel members are less radially extensive than the side walls of the inner female channel members and the outwardly presented edges of the side walls of mated inner and outer channel members are arranged substantially flush have their free edges arranged substantially flush to provide heat dissipating fins.

4. The invention defined in claim 1, to which is added means to secure the male channel member of each mated pair to the female channel member at the predetermined depth of insert.

References Cited by the Examiner

UNITED STATES PATENTS

| 2,058,022 | 10/36 | Lebre | 257—245 |
| 2,574,190 | 11/51 | New. | |
| 2,844,939 | 7/58 | Schultz | 60—39.69 |
| 2,913,873 | 11/59 | Murray | 60—39.69 |
| 2,943,442 | 7/60 | Baehr | 60—39.66 X |

FOREIGN PATENTS

| 927,739 | 5/47 | France. |
| 143,015 | 5/20 | Great Britain. |

SAMUEL LEVINE, *Primary Examiner.*
ABRAM BLUM, *Examiner.*